Patented Oct. 29, 1940

2,219,550

UNITED STATES PATENT OFFICE 2,219,550

COMPOSITION AND PROCESS FOR MAKING A FLEXIBLE PRODUCT

Samuel M. Martin, Jr., Trenton, N. J., assignor to Thiokol Corporation, Yardville, N. J., a corporation of Delaware No Drawing. Application March 2, 1937, Serial No. 128,625. Renewed March 12, 1940

2 Claims. (Cl. 260—9)

This invention relates to a composition for making flexible products that may be used for various purposes, and to the process of producing such products. By this invention particles of solid non-adhering material that are not rendered plastic by heating are securely held together in such a manner as to produce a variety of different shapes which are flexible or resilient and have excellent lasting qualities.

This invention is especially useful for making sheets that may be used for floor coverings where it is important that slippery surfaces do not occur or where corrosive or other injurious substances are apt to strike the floor, and it is also especially useful for making sheets that are to be applied where good heat and electrical insulating properties are desired. Shapes other than sheets may also be made by this invention for other purposes where the properties of the material render it useful, as will be obvious from the following description.

In carrying out this invention particles of organic matter, such as ground cork or leather, disintegrated particles of cured rubber, or short strands or fibers of cotton, wool, silk and rayon, for example, are bound together in such a way that permanent shapes are obtained and the particles of organic matter are well protected from deleterious influences.

The binding material that is used for the solid particles is rubber-like in some respects as it can be cured in a manner similar to the vulcanization of rubber and can be stretched and will return to its original shape. It has a relatively high combined sulfur content, a high degree of chemical stability, considerable resistance to a large variety of organic solvents, high resistance to atmospheric oxidation, and resistance to attack by dilute solutions of acids and alkalies. It can be made to adhere to many substances, such as rubber, wood, metal, and other plastics. It has high dielectric strength, excellent insulating qualities for heat and electricity, and is non-hygroscopic.

The binding material or reaction products can be made by causing chemical reaction to take place between soluble polysulfides, such as polysulfides of alkaline metals and alkaline earth metals, and organic compounds which react with these polysulfides to form products of the character mentioned.

The organic compounds that may be reacted with these alkaline polysulfides to form the binding material may be of the formula $XRX'$ or $XCH_2-R-CH_2X'$, where $X$ and $X'$ are monovalent negative elements or groups and $R$ is a divalent member capable of existing in stable combination with two symmetrically arranged methylene groups. In the formula $XRX'$, $R$ is an olefin or a derivative thereof, and in the formula $XCH_2-R-CH_2X'$, $R$ is oxygen or sulfur, or a chain of atoms having a minimum length of one atom and a maximum length of about eleven atoms linked together, which contains carbon, oxygen or sulfur, and may be a homogenous carbon chain or may be a heterogenous chain containing oxygen or sulfur atoms separated by carbon atoms. For example, $R$ in the formula $XRX'$ may be $C_nH_{2n}$, such as methylene or ethylene, and in the formula $XCH_2-R-CH_2X'$, it may be $CH_2O$ or $CH_2OCH_2$ or $CH_2OC_2H_4OCH_2$ or $C_6H_4$ for example when $X$ and $X'$ are chlorine or bromine for example.

The reaction between the polysulfide and the organic compound may be caused to take place by mixing them and heating them for about two or three hours at a temperature of about 100° C., the time and temperature varying considerably with different compounds. Also, by causing the reaction to take place in the presence of a dispersing agent, such as magnesium hydroxide, for example, the reaction product may be obtained in the form of a latex or suspension. Even when made without the presence of a dispersing agent the reaction product can be placed in solution by dissolving it in a suitable organic dispersing agent or solvent, e. g., trichloroethane, acetylene tetrachloride and chloroethoxy chloroether, for example.

The product of this invention may be made by coating the particles of non-adherent material with a solution or latex of the reaction product described above and introducing them into a mold where they are pressed and heated until they become united. The solvent for the reaction product or the liquid in which it is suspended is evaporated or otherwise removed, preferably before the materials are introduced into the mold.

The individual particles may be first coated with the reaction product and the coated particles formed by pressure and heat in the mold, or additional amounts of the reaction product can be introduced into the mold at the same time and become a portion of the finished article.

The following are given as specific examples of the process, but it is to be understood that the proportions, temperatures and sorts of non-adhering organic particles can be varied.

*Example 1.*—200 grams of rubber dust, that may have been obtained by grinding up tire treads, are added to a solution of 400 grams of the reaction product described above that had been cured by heating it. After the solvent evaporated the solids were placed in a cavity mold and heated under high pressure at about 287° F. for three minutes, thereby producing a firm, resilient and flexible integrated product.

*Example 2.*—100 grams of ground cork were added to 600 grams of a solution of the sort mentioned in Example 1, but containing 200 grams of the cured reaction product. After drying, the mixture then was placed in a cavity mold to mold it, put in a press and heated to 287° F. under high pressure for five minutes. The resulting sheet possessed physical properties similar to those described in Example 1.

*Example 3.*—50 grams of comminuted cork were first coated with a solution of the reaction product, the solvent permitted to evaporate, and 15 grams of the reaction product in powdered form was added and the mixture molded as described above.

*Example 4.*—50 grams of ground cork were mixed with 80 grams of the reaction product in powdered form and the mixture put into a cavity mold and heated to 298° F. under high pressure for five minutes, whereupon the result was a firm, resilient and flexible integrated product.

I claim:

1. A resilient composition comprising cork coated with a heat-cured reaction product of an alkaline polysulfide and an organic compound having the formula $X.CH_2.R.CH_2.X'$ where R is a divalent organic radical and X and X' are monovalent negative substituents, said cork being compressed together.

2. The process which comprises coating particles of cork with a resilient binder comprising the reaction product of an alkaline polysulfide and an organic compound having the formula $X.CH_2.R.CH_2.X'$ where R is a divalent organic radical and X and X' are monovalent negative substituents, and subjecting the coated particles to heat and pressure.

SAMUEL M. MARTIN, Jr.